United States Patent
Mitchell et al.

(10) Patent No.: US 9,141,664 B2
(45) Date of Patent: Sep. 22, 2015

(54) SYSTEM AND METHOD FOR OPTIMIZING QUERIES

(75) Inventors: Roger Mitchell, Austin, TX (US); Renu Varshneya, Cupertino, CA (US); Awny K. Al-Omari, Cedar Park, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1162 days.

(21) Appl. No.: 12/550,834

(22) Filed: Aug. 31, 2009

(65) Prior Publication Data
US 2011/0055198 A1 Mar. 3, 2011

(51) Int. Cl.
G06F 7/00 (2006.01)
G06F 17/30 (2006.01)

(52) U.S. Cl.
CPC .... *G06F 17/30404* (2013.01); *G06F 17/30442* (2013.01)

(58) Field of Classification Search
None
See application file for complete search history.

(56) References Cited

U.S. PATENT DOCUMENTS

| | | | |
|---|---|---|---|
| 5,875,334 A | 2/1999 | Chow et al. | |
| 6,311,181 B1 | 10/2001 | Lee et al. | |
| 6,374,263 B1 * | 4/2002 | Bunger et al. | 1/1 |
| 6,564,221 B1 * | 5/2003 | Shatdal | 1/1 |
| 6,801,903 B2 * | 10/2004 | Brown et al. | 1/1 |
| 6,850,925 B2 | 2/2005 | Chaudhuri et al. | |
| 7,100,076 B2 | 8/2006 | Johnson et al. | |
| 7,155,428 B1 | 12/2006 | Brown et al. | |
| 7,168,001 B2 | 1/2007 | Johnson et al. | |
| 7,213,012 B2 * | 5/2007 | Jakobsson | 1/1 |
| 7,240,044 B2 | 7/2007 | Chaudhuri et al. | |
| 7,383,246 B2 * | 6/2008 | Lohman et al. | 1/1 |
| 7,386,538 B2 | 6/2008 | Muras | |
| 7,499,907 B2 | 3/2009 | Brown et al. | |
| 7,509,311 B2 | 3/2009 | Galindo-Legaria et al. | |
| 7,512,600 B2 | 3/2009 | Al-Omari et al. | |
| 7,512,841 B2 | 3/2009 | Walker et al. | |
| 7,613,623 B2 | 11/2009 | Nemecek et al. | |
| 7,667,628 B2 * | 2/2010 | Breiling | 341/81 |
| 7,805,411 B2 * | 9/2010 | Ziauddin et al. | 707/688 |
| 7,853,728 B2 * | 12/2010 | Vageline et al. | 710/8 |
| 2003/0055813 A1 | 3/2003 | Chaudhuri et al. | |
| 2003/0088579 A1 * | 5/2003 | Brown et al. | 707/104.1 |
| 2004/0002956 A1 * | 1/2004 | Chaudhuri et al. | 707/2 |
| 2004/0128290 A1 * | 7/2004 | Haas et al. | 707/5 |
| 2004/0225639 A1 * | 11/2004 | Jakobsson et al. | 707/2 |
| 2004/0225915 A1 | 11/2004 | Johnson et al. | |
| 2004/0249810 A1 * | 12/2004 | Das et al. | 707/5 |
| 2005/0033730 A1 | 2/2005 | Chaudhuri et al. | |

(Continued)

OTHER PUBLICATIONS

El-Helw, Amr et al., "Collecting and Maintaining Just-in-Time Statistics," Waterloo University, Ontario, Data Engineering, 2007, ICDE 2007, IEEE 23rd International Conference, Publication Date: Apr. 15-20, 2007, pp. 516-525.

*Primary Examiner* — Loan T Nguyen

(57) ABSTRACT

There is provided a computer-implemented method of optimizing a query. An exemplary method comprises receiving a first request from an optimizer that specifies a table, a first predicate and a first sample size, wherein the optimizer is optimizing a relational query language statement that specifies the table and the first predicate. The exemplary method also comprises generating a sample table, comprising a first subset of rows from the table, based on the request. The exemplary method also comprises selecting a second subset of rows from the sample table based on the predicate. The exemplary method additionally comprises sending a count of rows in the second subset to the optimizer.

10 Claims, 5 Drawing Sheets

(56) References Cited

U.S. PATENT DOCUMENTS

| | | |
|---|---|---|
| 2005/0278357 A1 | 12/2005 | Brown et al. |
| 2006/0020579 A1* | 1/2006 | Freedman et al. ............. 707/3 |
| 2006/0218128 A1 | 9/2006 | Muras |
| 2007/0226178 A1* | 9/2007 | Ewen et al. .................. 707/2 |
| 2008/0052266 A1 | 2/2008 | Goldstein et al. |
| 2008/0086444 A1 | 4/2008 | Yu et al. |
| 2008/0228709 A1 | 9/2008 | Muras |
| 2008/0228710 A1 | 9/2008 | Muras |
| 2008/0288446 A1* | 11/2008 | Hu et al. .................. 707/2 |
| 2009/0249027 A1* | 10/2009 | Kim et al. ................. 712/5 |

* cited by examiner

SYSTEM AND METHOD FOR OPTIMIZING QUERIES

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

When processing a query, database management systems use statistical information in the form of column histograms that describes column data distributions in order to generate a good query plan for execution. While the query specifies what data is to be accessed, the query plan specifies how the data is to be accessed. The process of generating the query plan is referred to as optimization.

A histogram is a collection of non-overlapping intervals of the column values and a summary of the data distribution within each interval. Generally, histograms are adequate for good selectivity estimation of equality (for example, Country='Germany') and range predicates (e.g. Age<21) particularly when the data distribution is relatively uniform within the interval.

On the other hand, histograms may not provide good selectivity estimations of more complex predicates. For example, histograms can be insufficient for obtaining good selectivity estimates of equality and range predicates if the columns involved in the predicates are not independent or the data is not uniform. These histogram limitations may cause the database optimizer to generate a poor query plan, resulting in slow execution.

BRIEF SUMMARY OF THE INVENTION

Not Applicable

BRIEF DESCRIPTION OF THE SEVERAL VIEWS OF THE DRAWINGS

Certain exemplary embodiments are described in the following detailed description and in reference to the drawings, in which.

DETAILED DESCRIPTION OF THE INVENTION

Figure 1A:
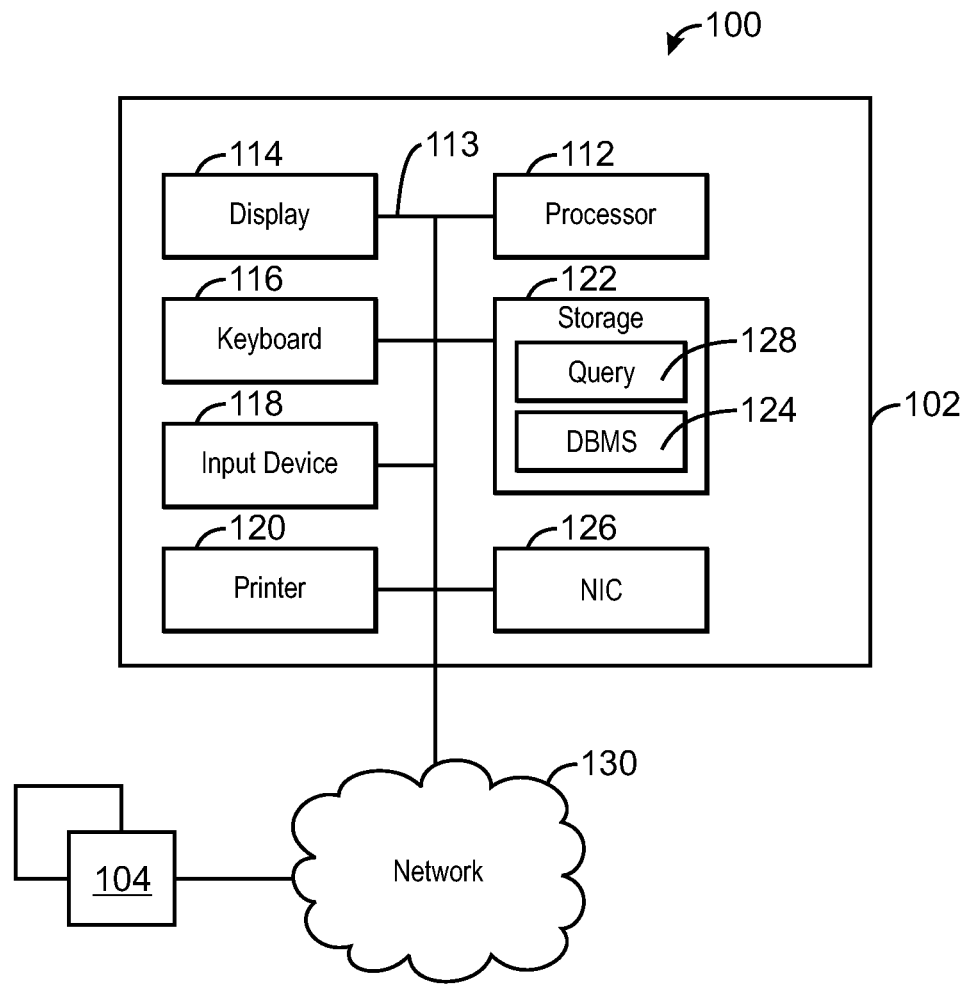
FIG. 1A is a block diagram of a system adapted to optimize a query on a database management system according to an exemplary embodiment of the present invention.

FIG. 1A is a block diagram of a system adapted to optimize a query on a database management system according to an exemplary embodiment of the present invention. The system is generally referred to by the reference number 100. Those of ordinary skill in the art will appreciate that the functional blocks and devices shown in FIG. 1A may comprise hardware elements including circuitry, software elements including computer code stored on a tangible, machine-readable medium or a combination of both hardware and software elements. Additionally, the functional blocks and devices of the system 100 are but one example of functional blocks and devices that may be implemented in an exemplary embodiment of the present invention. Those of ordinary skill in the art would readily be able to define specific functional blocks based on design considerations for a particular electronic device.

The system 100 may include a database server 102, and one or more client computers 104, in communication over a network 130. As illustrated in FIG. 1A, the database server 102 may include a processor 112 which may be connected through a bus 113 to a display 114, a keyboard 116, one or more input devices 118, and an output device, such as a printer 120. The input devices 118 may include devices such as a mouse or touch screen.

The database server 102 may also be connected through the bus 113 to a network interface card (NIC) 126. The NIC 126 may connect the database server 102 to the network 130. The network 130 may be a local area network (LAN), a wide area network (WAN), or another network configuration. The network 130 may include routers, switches, modems, or any other kind of interface device used for interconnection.

The database server may have other units operatively coupled to the processor 112 through the bus 113. These units may include tangible, machine-readable storage media, such as storage 122. The storage 122 may include media for the long-term storage of operating software and data, such as hard drives. The storage 122 may also include other types of tangible, machine-readable media, such as read-only memory (ROM) and random access memory (RAM). The storage 122 may include the software used in exemplary embodiments of the present techniques.

The storage 122 may include a database management system (DBMS) 124 and a query 128. The DBMS 124 may include a set of computer programs that controls the creation, maintenance, and use of databases by an organization and its end users. The DBMS 124 is described in greater detail with reference to FIG. 1B.

The query 128 may be a relational query language statement for accessing or updating data stored in the DBMS 124. The query 128 may specify tables and columns to access, along with a predicate that specifies selection criteria for rows in the tables. Relational query languages may include any query language configured to access and update data stored in a relational database. In an exemplary embodiment, the relational query language statements may be Structured Query Language (SQL) statements.

Through the network 130, several client computers 104 may connect to the database server 102. The client computers 104 may be similarly structured as the database server 102, with exception to the storage of the DBMS 124. In an exemplary embodiment, the client computers 104 may be used to submit the query 128 to the database server 102 for optimization by the DBMS 124.

Figure 1B:
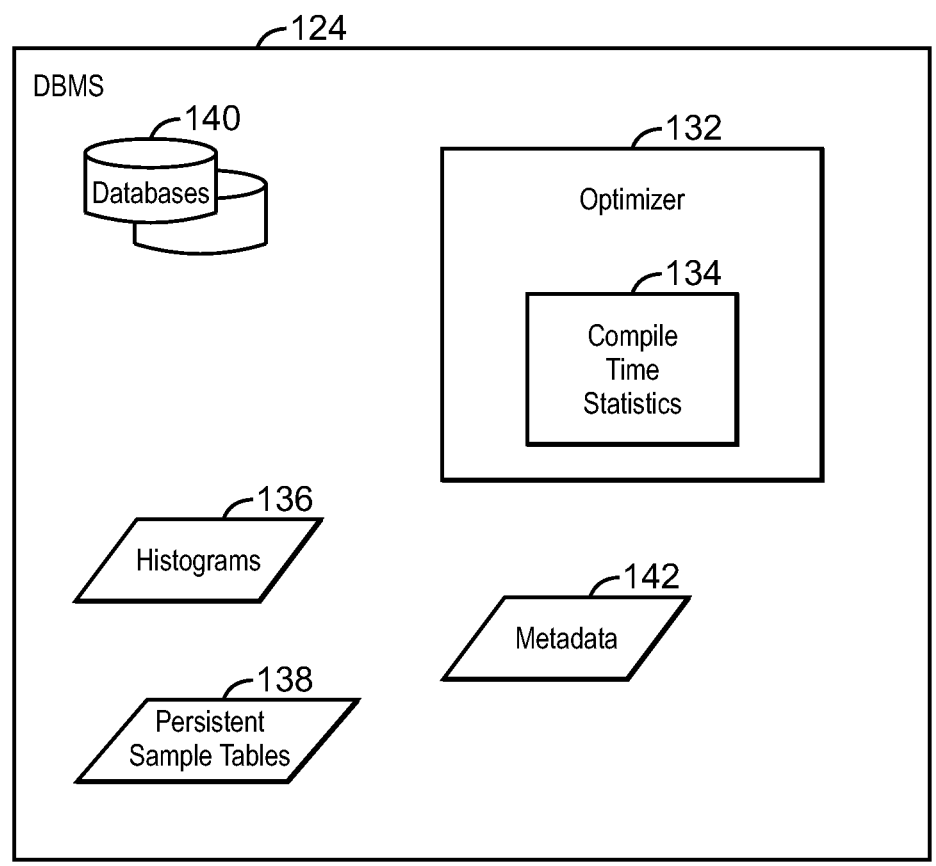
FIG. 1B is a block diagram of a database management system adapted to optimize the query according to an exemplary embodiment of the present invention.

FIG. 1B is a block diagram of the DBMS 124 adapted to optimize the query 128 according to an exemplary embodiment of the present invention. As illustrated, the DBMS 124 may include an optimizer 132, compile time statistics 134, histograms 136, persistent sample tables 138, metadata 142, and several databases 140 against which the query 128 may be executed. The databases 140 may include user data organized into tables, rows and columns, typical of a relational DBMS. In particular, one of the databases 140 may contain the table specified in the query 128, referred to herein as a source table.

The optimizer 132 may be software that generates a query plan 134 for the query 128. Generating the query plan 134 may be based on a cardinality estimate, which is a prediction of the number of rows that the query 128 will access during execution.

The optimizer 132 may determine the cardinality estimate based on the histograms 136 if the predicate of the query 128 is an equality or range predicate on a single column. However, if the histogram 136 includes statistics that indicate relatively high variations in the frequencies within the histogram interval, the cardinality estimate may be determined by using statistics collected by the compile time statistics 134.

The compile time statistics 134 may be software that determines the statistics used by the optimizer in generating the query plan. In an exemplary embodiment of the invention, the compile time statistics 134 may determine a sample row count by applying the predicate to a persistent sample table 138 corresponding to the table specified in the query 128. In other words, the sample row count may indicate a number of rows in the persistent sample table 138 for which the predicate is true. For example, for a predicate such as "Age<21," the sample row count may indicate how many rows in the persistent sample table have a value for the column Age that is less than 21.

The persistent sample table 138 may be a data store that includes a sampling of rows from the source table. Because the persistent sample table 138 is populated from the source table, the sample row count may indicate to what degree the predicate may be true for the source table.

The persistent sample table 138 may be a table with the same structure as the corresponding source table. However, the persistent sample table 138 may only contain a random sampling of the rows in the source table. As such, the persistent sample table 138 may be quickly queried with the predicate from the query 128 to determine the sample row count, and in turn, the cardinality estimate. In an exemplary embodiment of the invention, the persistent sample table 138 may contain a subset of columns from the source table. Also, multiple persistent sample tables 138 for multiple corresponding source tables may be included in the DBMS 124.

The compile time statistics 134 may also maintain the persistent sample table 138. Maintaining the persistent sample table 138 may include deleting and creating the persistent sample table 138 so the persistent sample table 138 may remain a representative sample of the source table. In an exemplary embodiment of the invention, the compile time statistics 134 may use metadata 142 to maintain the persistent sample table 138.

The metadata 142 may include information about the persistent sample table 138. For example, the metadata 142 may include statistics such as the number of updates, inserts and deletions performed on the source table corresponding to the persistent sample table 138. The persistent sample table 138 may then be replaced if the volume of updates, inserts, and deletes exceeds a specified threshold. In an exemplary embodiment of the invention, the metadata 142 may include flags indicating persistent sample tables 138 that have been replaced and are to be deleted by a batch process.

Figure 2:
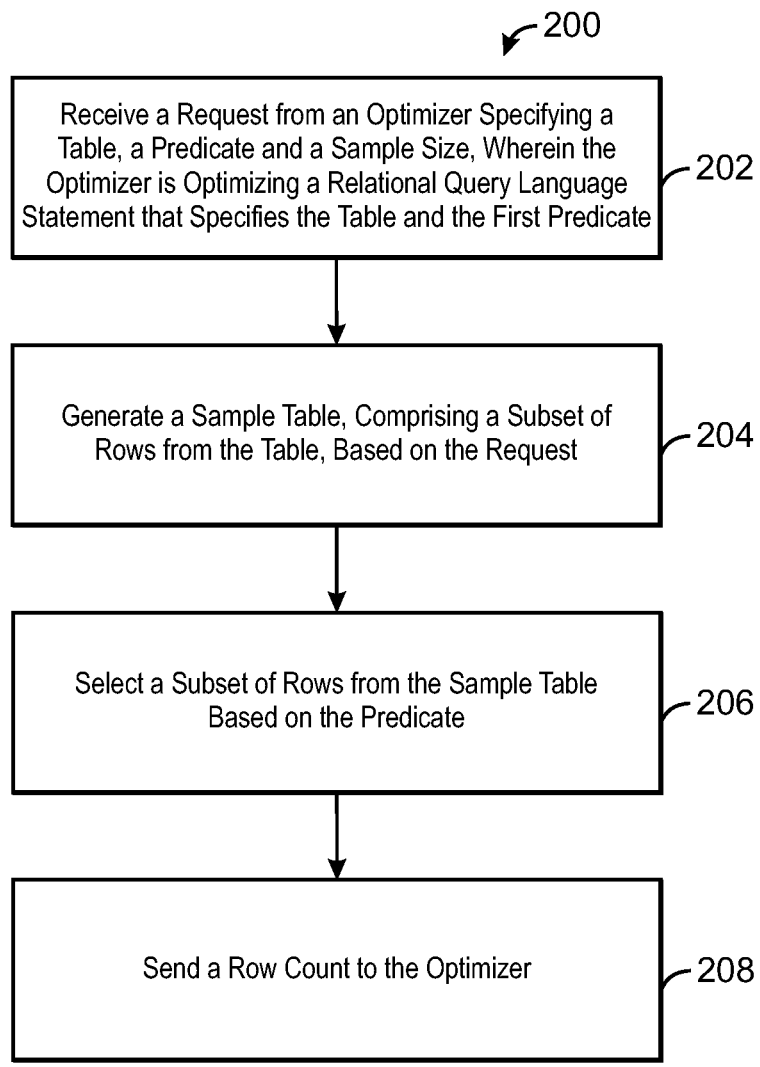
FIG. 2 is a process flow diagram showing a computer-implemented method for optimizing the query according to an exemplary embodiment of the present invention.

FIG. 2 is a process flow diagram showing a computer-implemented method for optimizing the query 128 according to an exemplary embodiment of the present invention. The method is generally referred to by the reference number 200, and may be performed by the compile time statistics 134.

The method begins at block 202. At block 202, the compile time statistics 134 may receive a request for the sample row count from the optimizer 132. The request may specify the table and predicate of the query 128, and a sample size. The sample size may indicate how large of a sample, i.e., how many rows in the persistent sample tables 138 are to be used to determine the sample row count.

At block 204, the compile time statistics 134 may generate a persistent sample table 138 for the source table specified in the request. The persistent sample table 138 may be populated with a random sample of rows retrieved from the source table.

In an exemplary embodiment of the invention, the persistent sample table 138 may be scrambled. A scrambled table may have rows clustered in random order with respect to the sequence of the same rows in the source table.

While the initial generation of the persistent sample table 138 may be computationally expensive, an advantage is gained through re-use. Specifically, once constructed, a random sample may be selected from the scrambled persistent sample table 138 by reading the first n rows, or any contiguous n rows. This may provide a cost savings in processing time.

For example, in the embodiment where the persistent sample table 138 is scrambled, only a single disk head seek and a fast sequential scan may be needed when applying the predicate to the persistent sample table. The single disk head seek may be needed for positioning at the scan starting point. This may be true regardless of the size of the source table.

In comparison to dynamic sampling, the savings in processing time may be significant. In dynamic sampling, the source table may be sampled during the optimization. In this manner, a disk head seek may be used for each row randomly selected from the source tables, a much greater cost than the single head seek and fast sequential scan described above.

At block 206, the compile time statistics 134 may select rows from the persistent sample table 138 using the predicate. Because the persistent sample table 138 only contains a sampling of the source table, the selectivity estimate may inherit statistical error dependent on the sample row count 'm' (smaller 'm' leads to higher error). Accordingly, in an exemplary embodiment of the invention, the optimizer 132 may also specify a sample row count, m, in the request sent to the compile time statistics 134 in order to set a lower limit on the selectivity estimate error.

In such an embodiment, the compile time statistics 134 may only scan the persistent sample table 138 until the specified sample row count is met. In this manner, the number of rows scanned in the persistent sample table 138 may be reduced because the scanning may terminate when the sample row count condition is met. In the embodiment where the rows of the persistent sample table 138 are scrambled, the following SQL may be used to obtain m rows for which the predicate is true:

```
SELECT [FIRST m]*FROM PERSISTENT_TABLE
    WHERE PREDICATE AND
    ROW_NUMBER<=n
```

At block 208, the optimizer 132 may send a sample row count to the optimizer 132. As stated previously, the sample row count may be the number of rows in the persistent sample table 138 for which the predicate is true. From the sample row count, the optimizer 132 may estimate the cardinality of the query 128, which may be used to generate the query plan 134.

Figure 3:
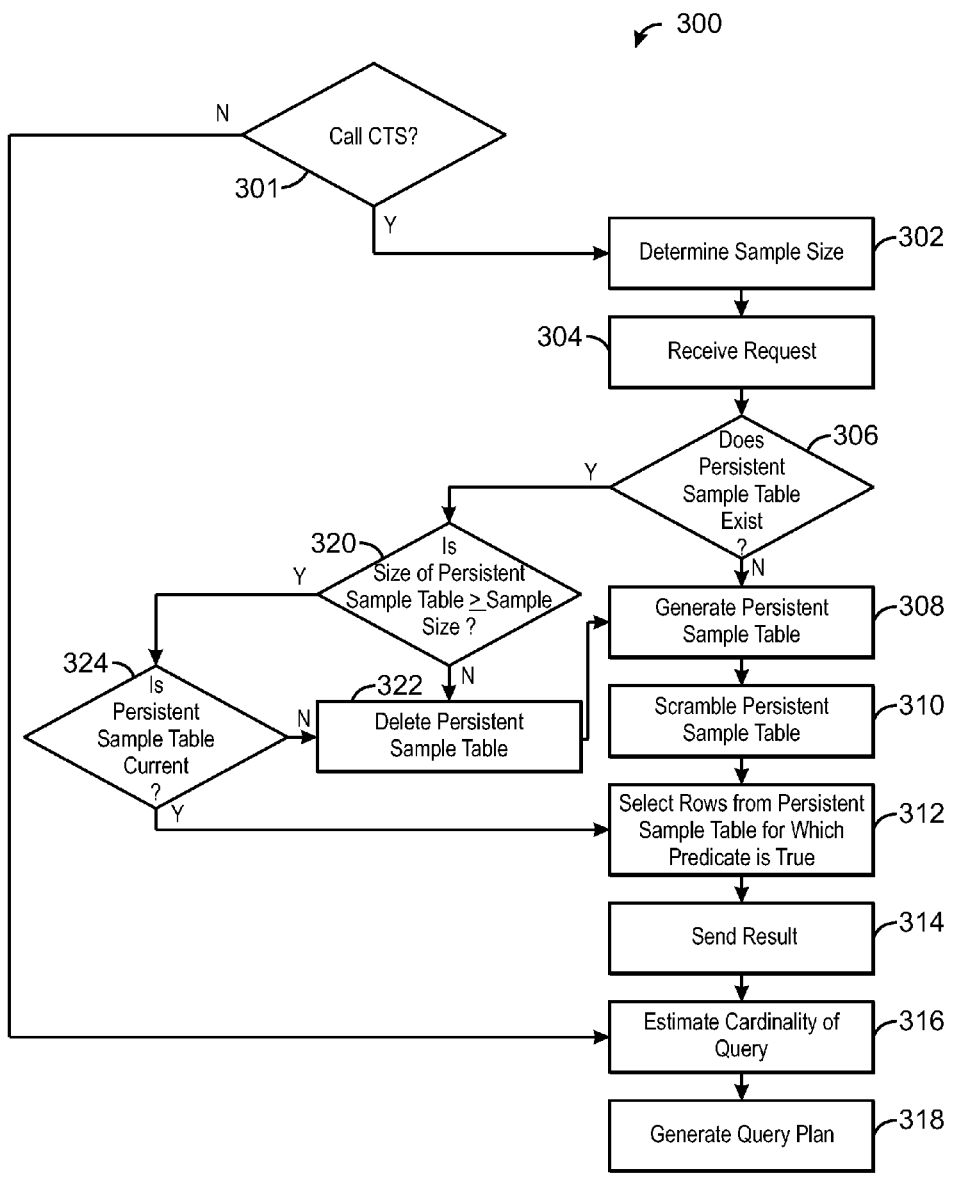
FIG. 3 is a process flow diagram showing a computer-implemented method for optimizing the query according to an exemplary embodiment of the present invention.

FIG. 3 is a process flow diagram showing a computer-implemented method for optimizing the query 128 according to an exemplary embodiment of the present invention. The method is generally referred to by the reference number 300, and may be performed by the optimizer 132 and the compile time statistics 134.

The method begins at block 301. At block 301, the optimizer 132 may determine whether to call the compile time statistics 134. The optimizer 132 may call the compile time statistics 134 in a number of different scenarios. Some of these scenarios include: there is no histogram 136 for the source table; the query 128 includes a complex expression, such as LIKE predicate, CAST expressions, string manipulation functions, and CASE statement; the predicate includes more than one correlated column; or the histogram 136 includes statistics that indicate relatively high variations within the histogram interval.

At block 302, the optimizer may determine the sample size. The sample size may be based on a specified accuracy level for the selectivity estimate. Typically, higher sample sizes may result in higher accuracy levels. The accuracy level may also be referred to, in the alternative, as an absolute error of the selectivity estimate. The absolute error may be proportional to $n^{-1/2}$, where n represents the sample size.

The sample size, n, may also be based on the cost of obtaining the sample row count. The cost may be used to limit the amount of time that the compile time statistics 134 uses to determine the sample row count. Having a desired limit on time to determine the sample row count may affect n, since smaller values for n may result in shorter processing times.

In an exemplary embodiment of the invention, the cost may be specified as a size limit of the entire sample, i.e., the size of all the rows scanned in the sample. For example, the size limit may be specified as 5 megabytes. If each row of the persistent sample table 138 is 500 bytes, the sample size may be limited to 10,000.

At block 304, the compile time statistics 134 may receive a request for a result from the optimizer 132. The request may specify the source table and predicate specified in the query 128, and a sample size.

At block 306, the compile time statistics 134 may determine if a persistent sample table 138 exists for the source table. If not, at block 308, the persistent sample table 138 may be generated for the table. If so, additional checks may be performed before using the existing persistent sample table 138.

At block 320, the compile time statistics 134 may determine if the size of the persistent sample table 138 is greater than or equal to the sample size specified in the request. If not, at block 322, the persistent sample table 138 may be deleted. Process flow may then proceed to block 308, where a new persistent sample table 138 may be generated for the source table.

If the size of the persistent sample table 138 is greater than or equal to the sample size specified in the request, another check may be performed before using the persistent sample table 138. At block 324, the compile time statistics 134 may determine if the persistent sample table 138 is current.

The determination of whether the persistent sample table 138 is current is made in light of the metadata 142 about the source table. For example if the metadata 142 indicates that the volume of updates, inserts, and deletes against the source table exceeds a specified threshold, the compile time statistics 134 may determine that the persistent sample table 138 is not current.

If the persistent sample table 138 is not current, process flow may proceed to block 322, where the persistent sample table 138 may be deleted. If the persistent sample table 138 is current, process flow may proceed to block 312.

Referring back to block 306, if the compile time statistics 134 determines that the persistent sample table 138 for the source table does not exist, at block 308 the persistent sample table 138 may be generated. The persistent sample table 138 may be populated with a random sample of rows retrieved from the table specified in the request.

At block 310, the compile time statistics 134 may scramble the persistent sample table 138. The structure of the scrambled table may be the same as the source table, but with an additional column, referred to herein as a row number column. The row number column may be a sequential integer clustering key, representing the order of the rows in the scrambled table.

The retrieved rows may be scrambled by using the row number column. For example, the row number column may be populated with a random integer for each row. The rows may then be sorted by the row number value, and inserted into the persistent sample table 138 in the sorted order. The SQL statement below shows an example of how the scrambled table may be constructed:

```
INSERT INTO PERSISTENT_TABLE SELECT
    SEQUENCE, *FROM SOURCE_TABLE
    SAMPLE RANDOM SAMPLE_SIZE ORDER
    BY RAND( )
```

It should be noted that the SQL shown here is merely a representation of one standard of SQL, and different implementations of the embodiments described herein may vary according to particular implementations of SQL. Also, because the rows are scrambled before insertion, there may be no correlation between the order of rows in the persistent sample table 138 and the corresponding source table. As such, any contiguous sequence of rows in the persistent sample table 138 can provide a random representation of the source table.

At block 312, the compile time statists 314 may select rows from the persistent sample table 138 for which the predicate is true. The following SQL statement may obtain rows for which the predicate is true in a sample of size n:

```
SELECT*FROM PERSISTENT_TABLE WHERE
    PREDICATE AND ROW_NUMBER<=n
```

At block 314, the compile time statistics 134 may send a result to the optimizer 132. As stated previously, the result may be the sample row count that results from applying the predicate to the persistent sample table 138.

Additionally, the result may include the possible error introduced into the selectivity estimate due to the sample size, for a given confidence level. For example, from the selectivity estimate, P, the possible error for a 95% confidence level may be calculated using a standard population proportion error equation. In this manner, the possible error may be calculated as: $E = 1.96 \, (P \, (1-P)/n)^{1/2}$. This possible error is referred to herein as a selectivity estimate error. The selectivity estimate error may also be sent to the optimizer 132.

In an exemplary embodiment of the invention, the result may include column data for the rows in the persistent sample table 138 for which the predicate is true. In another exemplary embodiment, the result may include an aggregation of the column data. The aggregation may include statistics, such as minimum, maximum, or average values of the column data. Alternatively, the result may include a summary of the column data.

At block 316, the optimizer 132 may estimate the cardinality of the query 128. For example, from the sample row count, a selectivity estimate may be calculated. The selectivity estimate may indicate the percentage of rows in the persistent sample table 138 for which the predicate is true. Given a persistent sample table 138 of size n, and a sample row count m, the selectivity estimate may be calculated as P=m/n. The selectivity estimate may then be applied to the source table to estimate the cardinality of the query 128.

Alternatively, the estimate of the cardinality may be based on any desired statistics, such as the minimum value, maximum value, range, and most frequent values. In another exemplary embodiment of the invention, the optimizer 132 may create intermediate histograms for use of further cardinality estimates of table join results in the query tree.

At block 318, the optimizer 132 may generate the query plan 134. As stated previously, generating the query plan 134 may be based on the cardinality estimate.

Figure 4:
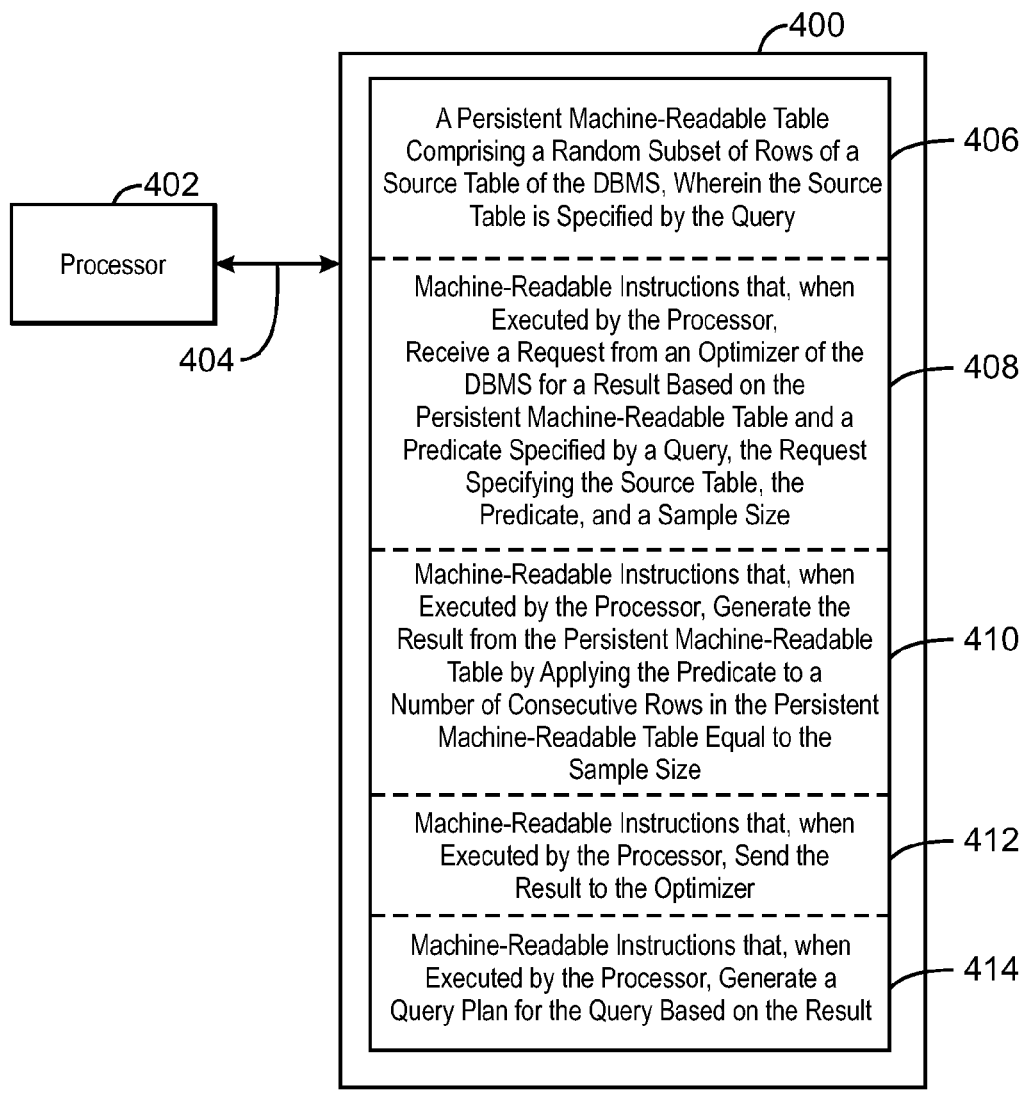
FIG. 4 is a block diagram showing a tangible, machine-readable medium that stores code adapted to optimize the query according to an exemplary embodiment of the present invention.

FIG. 4 is a block diagram showing a tangible, machine-readable medium that stores code adapted to facilitate optimizing the query 128 according to an exemplary embodiment of the present invention. The tangible, machine-readable medium is generally referred to by the reference number 400.

The tangible, machine-readable medium 400 may correspond to any typical storage device that stores computer-implemented instructions, such as programming code or the like. Moreover, tangible, machine-readable medium 400 may be included in the storage 122 shown in FIG. 1. When read and executed by a processor 402 such as the processor 112 shown in FIG. 1, the instructions stored on the tangible, machine-readable medium 400 are adapted to cause the processor 402 to optimize the query 128. The processor 402 accesses tangible, machine-readable medium 400 over a bus 404.

A first region 406 of the tangible, machine-readable medium 400 stores a persistent machine-readable table comprising a random subset of rows of a source table of the DBMS 124. The source table may be specified by the query 128.

A second region 408 of the tangible, machine-readable medium 400 stores machine-readable instructions that, when executed by the processor 402, receive a request from the optimizer 132 of the DBMS 124 for a result. The result may be based on the persistent machine-readable table and a predicate specified by the query 128. The request may specify the source table, the predicate, and a sample size.

A third region 410 of the tangible, machine-readable medium 400 stores machine-readable instructions that, when executed by the processor 402, generate the result from the persistent machine-readable table. The result may be generated by applying the predicate to a number of consecutive rows equal to the sample size, in the persistent machine-readable table.

A fourth region 412 of the tangible, machine-readable medium 400 stores machine-readable instructions that, when executed by the processor 402, send the result to the optimizer 132. A fifth region 414 of the tangible machine-readable medium stores machine-readable instructions that, when executed by the processor 402, generate the query plan 134 for the query 128. The query plan 134 may be based on the result.

What is claimed is:

1. A computer-implemented method of optimizing a query, comprising:
    receiving a first request from an optimizer that specifies a table, a first predicate and a first sample size, wherein the optimizer is optimizing a relational query language statement that specifies the table and the first predicate;
    generating a sample table, comprising a first subset of rows from the table, based, at least in part, on the first request;
    selecting the first subset of rows from the sample table based, at least in part, on the first predicate;
    sending a count of rows in the first subset of rows to the optimizer, wherein generating the sample table comprises:
        selecting the first subset of rows from the table randomly; and
        inserting the first subset of rows into the sample table; and
    scrambling the first subset of rows retrieved from the table, wherein a sequence of the scrambled rows in the sample table is different than a sequence of the first subset of rows in the table, and wherein the first subset of rows retrieved from the table are scrambled before inserting into the sample table.

2. A computer system for optimizing a query in a database management system (DBMS), the computer system comprising:
    a processor that is adapted to execute stored instructions; and
    a memory device that stores instructions and data, the memory device comprising:
        a persistent sample table comprising a random subset of rows of a source table of the DBMS, wherein the source table is specified by the query;
        computer-implemented code adapted to generate the persistent sample table by selecting a subset of rows from the source table and inserting the subset of rows into the persistent sample table;
        computer-implemented code adapted to scramble the subset of rows retrieved from the source table, wherein a sequence of the scrambled rows in the persistent table is different than a sequence of the subset of rows retrieved from the source table, and wherein the subset of rows retrieved from the source table are scrambled before inserting into the persistent table to provide the random subset of rows;
        computer-implemented code adapted to receive a request from an optimizer of the DBMS for a result based, at least in part, on the persistent sample table and a predicate specified by the query, the request specifying the source table, the predicate, and a sample size;
        computer-implemented code adapted to generate the result from the persistent sample table by applying the predicate to a number of consecutive rows in the persistent sample table equal to the sample size;
        computer-implemented code adapted to send the result to the optimizer; and
        computer-implemented code adapted to generate a query plan for the query based, at least in part, on the result.

3. The computer system recited in claim 2, wherein the DBMS does not comprise a histogram for the source table.

4. The computer system recited in claim 2, comprising computer-implemented code adapted to determine that the predicate is not an equality predicate or a range predicate.

5. The computer system recited in claim 2, further comprising computer-implemented code adapted to estimate a cardinality of the query for the source table based, at least in part, on the result, the persistent sample table, and the source table.

6. The computer system recited in claim 2, wherein the result comprises at least one of a number of rows in the persistent sample table for which the predicate is true, column data for the rows in the persistent sample table for which the predicate is true, a summary of the column data, an aggregation of the column data, a selectivity estimate error, or combinations thereof.

7. The computer system recited in claim 2, wherein the source table comprises a clustering key, and the persistent sample table further comprises the clustering key.

8. The computer system recited in claim 2, wherein the persistent sample table comprises a row number column that specifies a sequence of the rows of the persistent sample table, wherein the row number column is a sequential integer clustering key, and wherein the sequence of the rows of the persistent sample table is different from a sequence of the rows of the source table.

9. The computer system recited in claim 2, wherein the sample size is based, at least in part, on at least one of an allowable error for a selectivity estimate of the predicate and the sample table, a specified size limit of a first subset of rows, or combinations thereof.

10. A non-transitory tangible machine-readable medium that stores machine-readable instructions executable by a processor to optimize a query in a database management system (DBMS), the non-transitory tangible machine-readable medium comprising:

a persistent machine-readable table comprising a random subset of rows of a source table of the DBMS, wherein the source table is specified by the query; the persistent machine-readable table is generated by:
  selecting a first subset of rows from the source table;
  scrambling the first subset of rows retrieved from the source table, wherein a sequence of the scrambled rows of the persistent machine-readable table is different than a sequence of the first subset of rows in the source table;
  inserting the scrambled first subset of rows into the persistent machine-readable table to provide the random subset of rows for the persistent machine-readable table;
machine-readable instructions that, when executed by the processor, receive a request from an optimizer of the DBMS for a result based on the persistent machine-readable table and a predicate specified by the query, the request specifying the source table, the predicate, and a sample size;
machine-readable instructions that, when executed by the processor, generate the result from the persistent machine-readable table by applying the predicate to a number of consecutive rows in the persistent machine-readable table equal to the sample size;
machine-readable instructions that, when executed by the processor, send the result to the optimizer; and
machine-readable instructions that, when executed by the processor, generate a query plan for the query based on the result.

* * * * *